United States Patent
Smith et al.

(10) Patent No.: US 11,162,553 B2
(45) Date of Patent: Nov. 2, 2021

(54) EXTERNALLY-DAMPED ELECTROMECHANICAL VALVE ASSEMBLIES

(71) Applicant: Deere & Company, Moline, IL (US)

(72) Inventors: Corey Smith, Waterloo, IA (US); Bunpreet Singh, Cedar Falls, IA (US); Anthony M. Castaneda, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 304 days.

(21) Appl. No.: 16/273,785

(22) Filed: Feb. 12, 2019

(65) Prior Publication Data

US 2020/0256416 A1    Aug. 13, 2020

(51) Int. Cl.
| | |
|---|---|
| *F16F 1/40* | (2006.01) |
| *F16K 31/02* | (2006.01) |
| *F16F 1/371* | (2006.01) |
| *F16F 15/08* | (2006.01) |
| *F16F 3/087* | (2006.01) |

(52) U.S. Cl.
CPC ............. *F16F 1/40* (2013.01); *F16F 1/3713* (2013.01); *F16F 3/0876* (2013.01); *F16F 15/08* (2013.01); *F16K 31/02* (2013.01); *F16F 2228/04* (2013.01)

(58) Field of Classification Search
CPC .......... F16F 1/40; F16F 1/3713; F16F 3/0876; F16F 2228/04; F16F 15/08; F16K 31/02
See application file for complete search history.

(56) References Cited

U.S. PATENT DOCUMENTS

| | | | | |
|---|---|---|---|---|
| 4,286,827 A | * | 9/1981 | Peterson | F16C 27/063 267/141.1 |
| 5,641,248 A | * | 6/1997 | Arlt, III | E21B 19/006 405/195.1 |

(Continued)

OTHER PUBLICATIONS

John Deere, Brochure, Off-Highway Diesel Engines Interim Tier 4—Stage III B, Oct. 2003.

(Continued)

*Primary Examiner* — Xuan Lan Nguyen
(74) *Attorney, Agent, or Firm* — Klintworth & Rozenblat IP LLP (57) ABSTRACT

Externally-damped electromechanical valve assemblies well-suited for deployment within high vibratory operating environments, such as those associated with work vehicle engines, are provided. In embodiments, the valve assembly includes a housing through which a flow passage extends, a valve element positioned in the flow passage, a valve actuator, and control electronics electrically coupled to the valve actuator. The valve assembly may also contain a constrained layer damper including a first mass element and a first viscoelastic layer. The first mass element is mounted in suspension to the housing exterior for movement relative thereto when the first mass element is excited by vibrations transmitted through the housing. Constrained between the first mass element and the housing exterior, the first viscoelastic layer deflects in shear as the first mass element moves relative to the housing to attenuate the vibrations transmitted through the housing by conversion of vibrational energy to heat.

16 Claims, 7 Drawing Sheets

(56) References Cited

U.S. PATENT DOCUMENTS

| | | | | |
|---|---|---|---|---|
| 7,290,985 B2* | 11/2007 | James | ............... | B64C 27/56 416/1 |
| 7,635,117 B2* | 12/2009 | Heuer | ............... | F16F 1/3821 267/140.2 |
| 8,308,149 B2* | 11/2012 | Blazic | ............... | F16F 15/08 267/141 |
| 8,511,997 B2* | 8/2013 | Cunningham | ........ | B64C 27/35 416/134 A |
| 8,919,725 B2* | 12/2014 | Sayre | ............... | F16F 15/08 248/638 |
| 9,068,621 B1* | 6/2015 | Halladay | ............ | F16C 27/02 |
| 9,309,949 B2* | 4/2016 | Kaneko | ............ | F16F 1/376 |
| 9,709,089 B2* | 7/2017 | Bohm | ............... | F16C 27/063 |
| 10,214,284 B2* | 2/2019 | Hunter | ............ | B64C 27/35 |
| 10,371,200 B2* | 8/2019 | Riedl | ............... | F16C 23/045 |
| 2006/0255518 A1* | 11/2006 | Steffens | ........... | F16F 1/38 267/293 |
| 2011/0248433 A1* | 10/2011 | Diemling | ........... | F16F 1/40 267/3 |
| 2017/0267260 A1* | 9/2017 | Fromont | ............ | B61F 5/50 |

OTHER PUBLICATIONS

Nicholas J. Oosting et al., Application of a Constrained Layer Damping Treatment to a Cast Aluminum V6 Engine Front Cover, SAE International, Jan. 2005.

Benjamin Shafer, An Overview of Constrained-Layer Damping Theory and Application, The Journal of the Acoustical Society of America, May 2013.

* cited by examiner

EXTERNALLY-DAMPED ELECTROMECHANICAL VALVE ASSEMBLIES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to damping electromechanical valve assemblies, for example, such assemblies within work vehicles and other high vibratory environments.

ABBREVIATIONS

Abbreviations appearing relatively infrequently in this document are defined upon initial usage, while abbreviations appearing more frequently in this document are defined below.
EGR—Exhaust gas recirculation;
EM—Electromechanical;
FMU—Fuel metering unit;
Hz—Hertz; and
$NO_x$—Nitrogen oxide including nitric oxide and nitrogen dioxide.

BACKGROUND OF THE DISCLOSURE

Electromechanical valve assemblies are often used with heavy-duty internal combustion engines, such diesel engines utilized onboard work vehicles employed within agricultural, construction, forestry, and mining industries (herein, "work vehicle engines"). In many instances, an EM valve assembly may perform functions directly impacting engine performance, emissions management, and other critical operational aspects of the engine. As a first example, work vehicle engines commonly include EM valve assemblies in the form of FMU-equipped pump assemblies. During operation of a conventional FMU-equipped pump assembly, a valve element within the FMU is modulated to meter fuel flow delivered to the engine cylinders under the influence of a high pressure fuel pump. Similarly, as a second example, heavy-duty work vehicle engines may be equipped with EGR systems containing EGR valve assemblies for enhanced emissions control. During operation of the EGR system, a valve element (e.g., a butterfly plate) within the EGR valve assembly is modulated to regulate exhaust flow through an EGR cooler and lower exhaust temperatures. The cooled exhaust flow is then mixed with pressurized air discharged from a turbocharger and rerouted to the intake manifold of the work vehicle engine. In certain cases, the exhaust may also be subject to catalytic reaction to further reduce levels of $NO_x$ entrained in the engine exhaust prior to discharge from the vehicle. Various other types of EM valve assemblies are also commonly integrated into work vehicle engines, with EGR valve assemblies and FMU-equipped pump assemblies representing but two examples.

SUMMARY OF THE DISCLOSURE

This disclosure provides externally-damped EM valve assemblies well-suited for deployment within relatively harsh, high vibratory operating environments, such as those encountered within heavy-duty work vehicles.

Embodiments of the externally-damped EM valve assembly include a housing through which at least one flow passage extends. A valve element is contained in the housing and positioned in the flow passage, an EM valve actuator is mechanically linked to the valve element, and control electronics are electrically coupled to the valve actuator. The externally-damped EM valve assembly further contains a constrained layer damper, which includes a first mass element and a first viscoelastic layer. In embodiments, the first mass element and the first viscoelastic layer may be metal body or layer and a molded polymer layer, respectively. The first mass element is mounted in suspension to an exterior surface of the housing for movement relative thereto when the first mass element is excited by vibrations transmitted through the housing. Comparatively, the first viscoelastic layer is constrained between the first mass element and the exterior surface of the housing to which the first mass element is mounted. The constrained layer damper is tuned such that the first viscoelastic layer deflects in shear as the first mass element moves relative to the housing to attenuate vibrations transmitted through the housing by conversion of vibrational energy to heat.

In further embodiments, the externally-damped EM valve assembly contains a housing including a flow body and a controller sub-housing, which is mounted to the flow body at an attachment interface. A flow passage extends through the flow body, a valve element is positioned in the flow passage, and a valve actuator is mechanically linked to the valve element. Control electronics are contained in the controller sub-housing and electrically coupled to the valve actuator, while a constrained layer damper is affixed to (e.g., bonded to or clamped against) an exterior of the housing at a location adjacent the attachment interface. The constrained layer damper includes at least one mass element and at least one viscoelastic layer, which intimately contacts or is otherwise placed in vibratory communication with the at least one mass element. The at least one mass element is mounted in suspension to the housing through the at least one viscoelastic layer such that the at least one mass element reciprocates or otherwise moves relative to the housing, when excited by vibrations transmitted therethrough, to dissipate the vibrations by conversion to heat within the at least one viscoelastic layer.

In still further embodiments, the externally-damped EM valve assembly includes a housing through which a flow passage extends, a valve element (e.g., a butterfly valve plate or translating spool) positioned in the flow passage, a valve actuator supported by the housing and mechanically linked to the valve element, and control electronics contained in the housing and electrically coupled to the valve actuator. A multi-terminal electrical connector, such as a multi-pin or socket connector, projects from the housing and is electrically coupled to the control electronics. A constrained layer damper is further mounted in suspension to an exterior surface of the housing. The constrained layer damper includes at least a first damper portion (e.g., containing a first mass element-viscoelastic layer pair) and a second damper portion (e.g., containing a second mass element-viscoelastic layer pair). The first damper portion is tuned to dampen vibrations transmitted through the housing and to the electrical connector within a first predetermined frequency range. The second damper portion tuned to dampen vibrations transmitted through the housing and to the electrical connector within a second predetermined frequency range different than the first predetermined frequency range.

In at least some implementations, the first and second frequency ranges may be non-overlapping.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

The following describes one or more example embodiments of externally-damped EM valve assemblies well-suited for deployment within relatively harsh, high vibratory operating environments, such as those associated with heavy-duty work vehicles. Embodiments of the present disclosure are shown in the accompanying figures of the drawings described briefly above. Various modifications to the example embodiments may be contemplated by one of skill in the art without departing from the scope of the present invention, as set-forth the appended claims.

OVERVIEW

As discussed briefly, EM valve assemblies are commonly utilized in conjunction with heavy-duty internal combustion engines, such diesel engines onboard work vehicles. By definition, an EM valve assembly includes control circuitry, an EM valve actuator operably coupled to the control circuitry, and at least one valve element mechanically linked to an output of the valve actuator. Further, in many instances, the valve actuator further includes an externally-accessible, multi-terminal electrical connector to facilitate electrical connection to the control circuitry within the valve assembly housing. Often, it is impractical to remotely locate such electronic components (e.g., the control electronics and any electrical connectors) from the valve actuator, the flow body, and the valve element itself. Consequently, when an EM valve assembly is inserted into a relatively harsh operational environment characterized by elevated temperatures, repeated thermal cycling, and high vibrations, the electronic components of the EM valve assembly are likewise subject to such harsh operating conditions. This can be problematic in that the electronic components of an EM valve assembly are often susceptible to various failure modes when inserted into such harsh operating environments, particularly when exposed to high frequency vibrations over prolonged periods of time. Solder joint failure and excessive connector fretting are examples of two such failure modes hastened by prolonged exposure to vibrations occurring at higher frequencies approaching or exceeding, for example, about 300 Hz.

A continued industrial demand thus exists for the provision of EM valve assemblies capable of providing prolonged, failure-free operation within relatively harsh, high vibration environments, including those associated with work vehicle engines. In satisfaction of this demand, the following discloses EM valve assemblies featuring unique constrained layer damping devices or isolation devices, which can be mounted to selected locations on the exterior of the valve assembly housings. Such constrained layer damping devices are referred to herein as "externally-mounted constrained layer dampers" or, more briefly, "constrained layer dampers." As described below, the constrained layer dampers are tuned and positioned to attenuate or dissipate vibrational energy prior to transmission to electronic components of a given EM valve assembly, such as the control electronics and/or any electrical connectors (if present). Through the strategic incorporation of such constrained layer dampers into EM valve assemblies, electronic components within the valve assembly may be better isolated from high frequency vibrations occurring within an operative environment, including vibrations within frequency ranges known to exacerbate connector fretting, solder joint failure, and other vibration-induced failure modes within the electronics. The overall reliability of the externally-damped EM valve assembly is enhanced as a result. Concurrently, in embodiments, the externally-mounted constrained layer dampers are amenable to integration into existing EM valve assemblies with relatively few, if any modifications to the underlying valve assemblies. Accordingly, embodiments of the EM valve assemblies may be equipped with the externally-mounted constrained layer dampers during original equipment manufacture or, instead, following original manufacture by retrofit installation. In either instance, the externally-mounted constrained layer dampers may be incorporated into a given EM valve assemblies in an efficient, cost effective manner.

Embodiments of the externally-mounted damper are advantageously tuned to target frequency ranges identified as problematic in exacerbating failure modes within the valve assembly electronics. Such tuning is accomplished through design and construction by, for example, selecting the components of a given constrained layer damper to possess certain physical characteristics. Such physical characteristics include the number, stiffness, and dimensions of the viscoelastic layer or layers contained in the constrained layer damper; the number, mass, and dimensions of the mass element or elements contained in the damper; and the number, positioning, and coupling arrangement (whether in series or in parallel) of the damper portions (e.g., viscoelastic layer-mass element pairs) when the damper contains multiple portions, as discussed below. The particular frequency range or ranges targeted by the externally-mounted dampers will vary among embodiments in relation to various factors, such as EM valve assembly type. However, as a generalized example, the constrained layer damper or dampers contained within a given EM valve assembly may be tuned to provide peak vibrational damping over at least one targeted frequency range between 300 Hz and 2000 Hz (or perhaps higher) in at least some instances. Further, to broaden the damping capabilities of the damper, a given constrained layer damper may be produced to include multiple viscoelastic layer-mass element pairs, which placed in series (e.g., joined in a stacked relationship) and imparted with disparate tunings. Further discussion in this regard is provided below. First, however, a general discussion of a work vehicle engine containing multiple externally-damped EM valve assemblies is provided to establish a non-limiting context in which embodiments of the EM valve assemblies may be better understood.

EXAMPLES OF EXTERNALLY-DAMPED EM VALVE ASSEMBLIES

Figure 1:
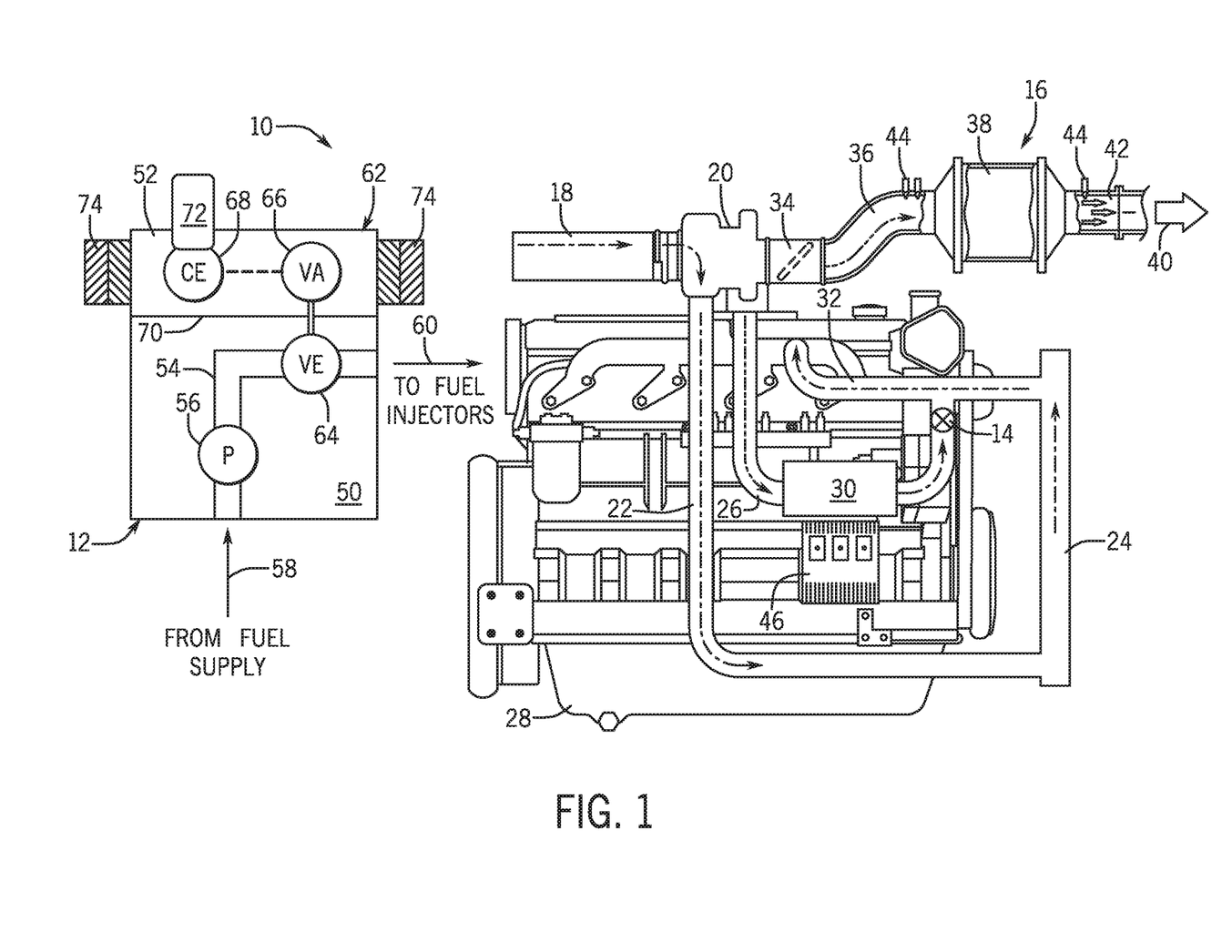
FIG. 1 is schematic illustrating a work vehicle engine containing at least two examples of externally-damped EM valve assemblies, as illustrated in accordance with an embodiment of the present disclosure.

Referring initially to FIG. 1, an internal combustion engine 10 utilizing a number of EM valve assemblies 12, 14 is illustrated in accordance with an example embodiment of the present disclosure. Either or both of the EM valve assemblies 12, 14 may be imparted with enhanced vibration damping capabilities through the strategic incorporation of externally-mounted constrained layer dampers, as discussed more fully below in connection with FIGS. 2-7. As will be recognized by one of ordinary skill in the industry, the internal combustion engine 10 may include, or may be utilized in conjunction with, any number of additional externally-damped EM valve assemblies in addition to or in lieu of the EM valve assemblies 12, 14 shown in FIGS.1-7 and discussed below. The following description of the externally-damped EM valve assemblies 12, 14 is therefore provided by way of non-limiting example only, with the understanding that the teachings presented throughout this document are equally applicable to other types of EM valve assemblies without limitation and regardless of whether such valve assemblies are utilized within an internal combustion engine or within another high vibratory operational environment.

The internal combustion engine 10 shown in FIG. 1 is well-suited for usage within a work vehicle of the type adapted to perform various tasks in the agricultural, forestry, construction, or mining industries. For this reason, the internal combustion engine 10 is referred to hereinafter as a "work vehicle engine 10." A non-exhaustive list of work vehicles in which the engine 10 may be deployed includes dozers, motor graders, tractors, harvesters, loaders, excavators, articulated dump trucks, skidders, forwarders, and feller bundlers, to list but a few examples. In certain embodiments, the work vehicle engine 10 may be a heavy-duty diesel engine including an EGR system 16 for emission reduction purposes. Specifically, the EGR system 16 may reduce NO and other contaminants in the exhaust generated during operation of the work vehicle engine 10. When provided, the EGR system 16 may contain at least one externally-damped EM valve assembly in the form of an externally-damped EM valve assembly 14. An example of the externally-damped EM valve assembly 14 is shown and described in greater detail below in connection with FIGS. 2-5. First, however, the EGR system 16 is described in greater detail.

In addition to the externally-damped EM valve assembly 14, the EGR system 16 further includes an air intake duct 18, which supplies ambient air to the inlet of a waste-gated turbocharger (WGT) 20. The WGT 20 discharges compressed air into a first conduit 22, which connects to an air-to-air cooler section 24. Concurrently, a second conduit 26 draws exhaust from an engine core 28 of the work vehicle engine 10, which is then cooled by passage through an EGR cooler 30. The EM valve assembly 14 is positioned in flow series with (e.g., downstream of) the EGR cooler 30 to regulate exhaust flow therethrough. After passing through the EM valve assembly 14, the cooled exhaust mixes within a bifurcated conduit 32 with the relatively cool airflow provided by the air-to-air cooler section 24. The bifurcated conduit 32 then directs the exhaust-air mixture into the intake manifold of the engine core 28. The exhaust temperature is decreased as a result, while oxygen levels within the exhaust-air mixture are optimized. In instances in which further emissions control is sought, the EGR system 16 may further include components supporting selective catalytic reduction (SCR) of particulate matter entrained in the exhaust. In this regard, exhaust may be received from the engine core 28, directed through a conduit 36, and into a diesel oxidation catalyst (DOC) chamber 38 for contact with a suitable catalyst. An exhaust throttle valve 34 may be positioned in the conduit 36 to regulate the flow of exhaust to the DOC chamber 38. As indicated by arrow 40, a conduit 42 connected to the outlet of the DOC chamber 38 conducts the treated exhaust into a non-illustrated reactor chamber in which the desired SRC reaction occurs prior discharge of the exhaust from the vehicle. Various other components may also be included in such an SRC sub-system, when present. Such other components may include a non-illustrated diesel exhaust fluid (DEF) injection sub-system, sensors of varying types (e.g., NO and temperature sensors 44), and a controller (e.g., engine control unit 46) for positioning the valve elements of the EGR system 16 in accordance with sensor input and pre-established control schemes.

In the example of FIG. 1, the work vehicle engine 10 is further equipped with a second externally-damped EM valve assembly 12 in the form of a metered high pressure (HP) pump assembly. The EM valve assembly 12 includes a housing 50, 52 through which a flow passage 54 extends. An HP pump 56 is contained within the housing 50, 52; and, when driven, urges fuel flow from an inlet of the housing 50, 52 (represented by arrow 58 in FIG. 1), through the flow passage 54, and to an outlet of the housing 50, 52 (represented by arrow 60). The HP pump 56 is a translating piston (e.g., axial piston) pump in an embodiment, although various other pumps and pump combinations can be utilized as equivalents. The EM valve assembly 12 meters fuel drawn from a fuel tank or other fuel supply source prior to delivery to fuel injectors within the engine core 28. To enable this fuel metering functionality, the EM valve assembly 12 further contains an FMU 62 including a valve element 64 (e.g., a translating spool) positioned in the flow passage 54, whether upstream or downstream of the pump 56. The EM valve assembly 12 also includes an EM valve actuator 66, which is mechanically linked to the valve element 64; and control electronics 68, which are electrically coupled to the valve actuator 66 for transmitting command signals thereto. In various embodiments, the housing 50, 52 may be assembled from two primary components or sub-assemblies: (i) a flow body 50 through which the flow passage 54 extends, and (ii) a controller sub-housing 52 mounted to the flow body 50 at an attachment interface 70. In such embodiments, the control electronics 68 and, perhaps, the valve actuator 66 may be contained within the controller sub-housing 52. Additionally, as generically shown in FIG. 1, a multi-terminal electrical connector 72 may project from the sub-housing 52 to facilitate electronic connection with the control electronics 68 when the EM valve assembly 12 is installed within the work vehicle engine 10.

During engine operation, vibrations may be generated by various moving components within the work vehicle engine 10, such as the pistons and the crankshaft within the engine core 28. Similarly, the HP pump 56 may generate vibrations during operation, particularly when the pump 56 assumes the form of a translating piston pump. In lower frequency ranges, such as frequency ranges below 300 Hz, such vibrations may be somewhat problematic in exacerbating component wear and high-cycle fatigue. These issues are typically easily addressed, however, with the implementation of improved structural support features, such as support brackets. Comparatively, at higher frequency ranges, such as frequencies between about 300 and about 2000 Hz, such vibrations can hasten failure modes within valve assembly electronics due to, for example, the relatively low mass of such components, thin material layers, critical electrical connections, and so on. Vibrations may be particularly problematic in exacerbating failure modes of an EM valve assembly when containing a non-metallic (e.g., molded thermoplastic) sub-housing, a metallic flow body to which the non-metallic sub-housing is mounted, and control electronics within the sub-housing electrically and interconnected with a multi-terminal electrical connector prone to fretting, as may be the case for either or both of the EM valve assemblies 12, 14.

While problematic, the severity and immediacy of vibration-induced failure modes within the valve assembly electronics is often insufficient to warrant significant redesign of such components or complex (e.g., active) vibration isolation systems dedicated to at least partly shielding the valve assemblies from high frequency vibrations. For such reasons, a relatively straightforward, passive vibration isolation solution is sought, particularly one which can be integrated into existing EM valve assemblies, such as the EM valve assemblies 12, 14, in a relatively straightforward, cost efficient manner. Accordingly, to address such issues, the EM valve assemblies 12, 14 are usefully further equipped with externally-mounted constrained layer dampers adapted to attenuate high frequency vibrations prior to transmission to the valve assembly electronics, as described below. An example of such constrained layer dampers 74, as mounted to the exterior of the housing 50, 52 of the EM valve assembly 12, appears schematically on the left of FIG. 1. Additional description of the externally-mounted constrained layer dampers 74 and, more generally, the EM valve assembly 12 is provided below in connection with FIGS. 6 and 7. So too may a similar constrained layer damper or multiple dampers be externally affixed around the housing of the EM valve assembly 14, as discussed below in connection with FIGS. 2-5. While the following description focuses on the EM valve assemblies 12, 14 for ease of discussion, it is again emphasized that any number of EM valve assemblies contained within or utilized in conjunction with the work vehicle engine 10 can be equipped with externally-mounted constrained layer dampers similar or identical to those described herein.

Figure 2:
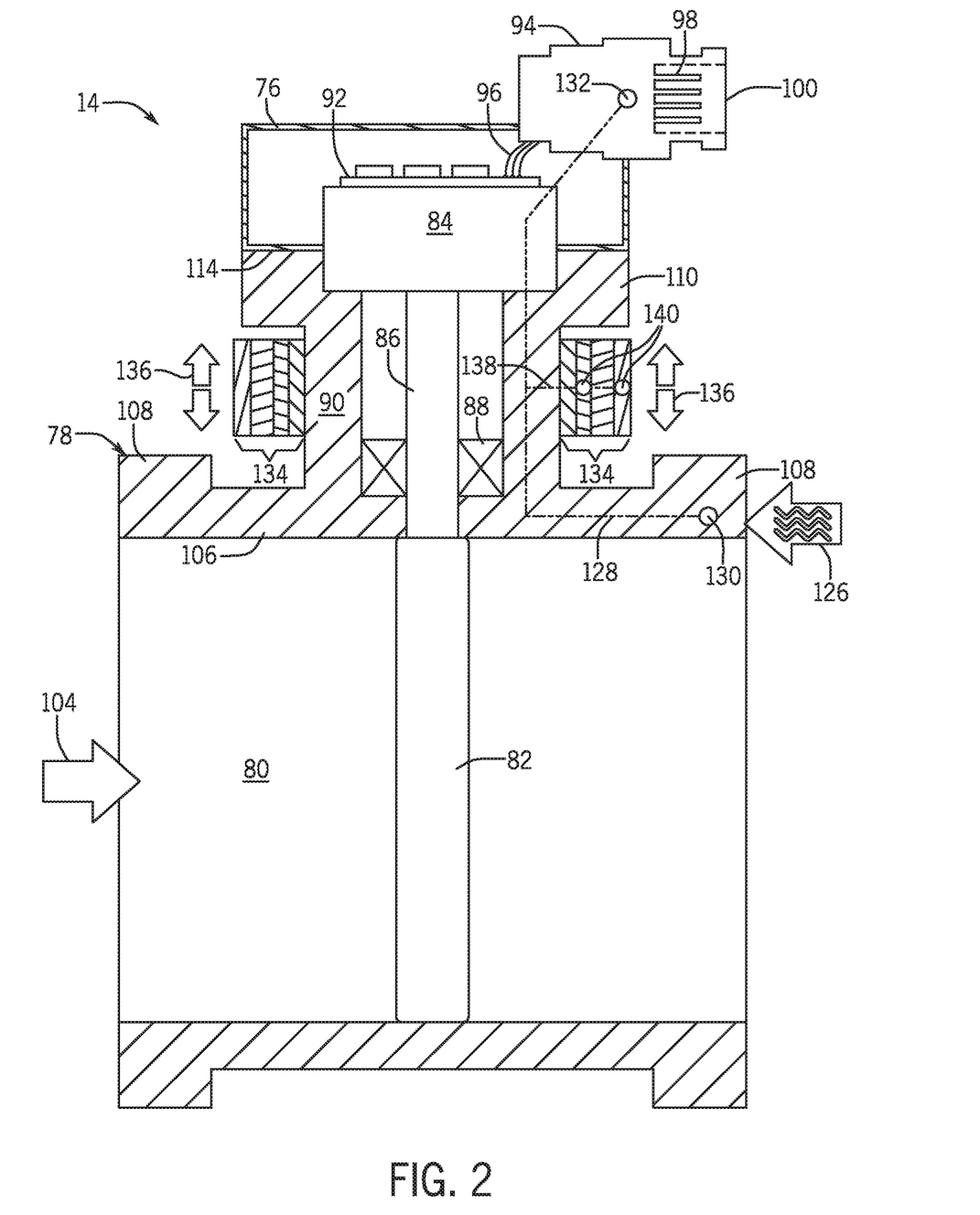
FIG. 2 is a cross-sectional schematic of a first example of an externally-damped EM valve assembly, here an EGR valve assembly including a multi-terminal electrical connector, usefully deployment in the work vehicle engine shown in FIG. 1.
Figure 3:
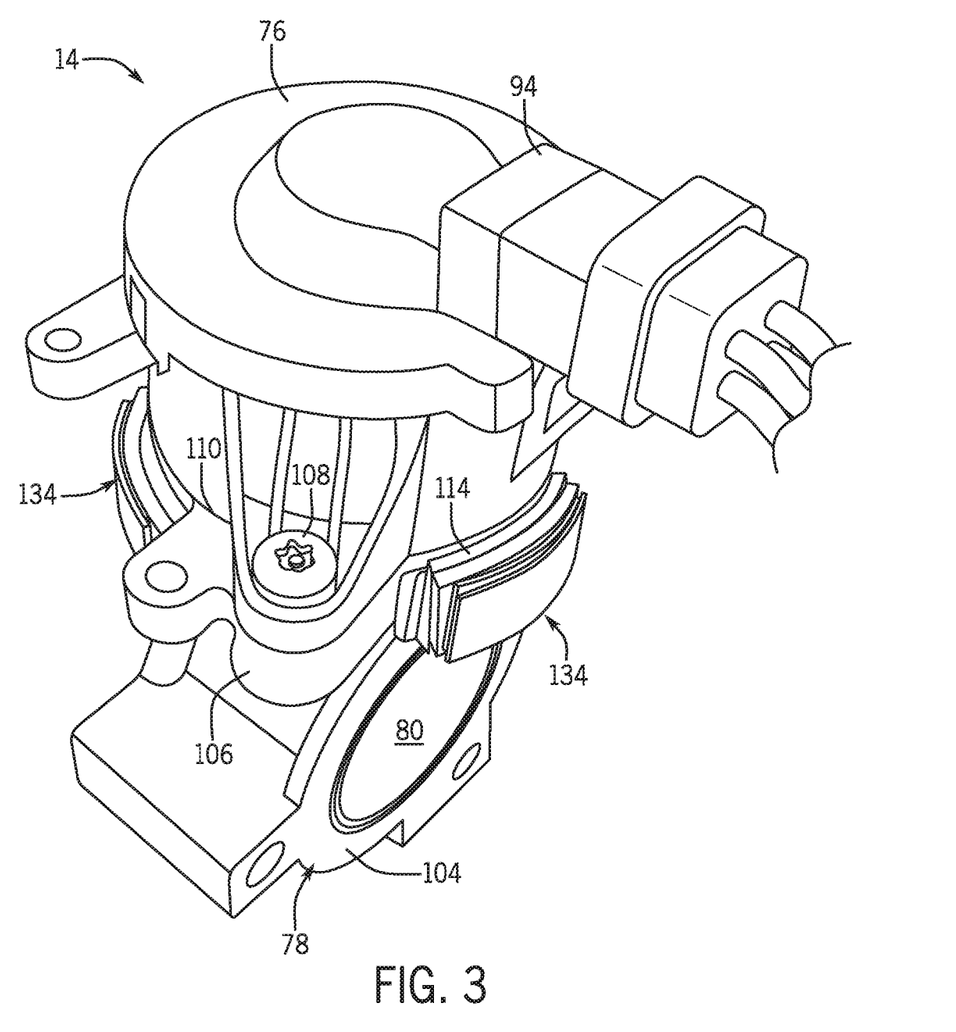
FIG. 3 is a side perspective view of the EGR valve assembly shown in FIG. 2, as well as a mating electrical connector plugged into the multi-terminal electrical connector of the EGR valve assembly.

Referring now to FIGS. 2 and 3, an example of the externally-damped EM valve assembly 14 includes a housing 76, 78 assembled from a controller sub-housing 76 and a larger flow body 78. A flow passage 80 extends through the flow body 78, and a valve element 82 is positioned in the flow passage 80. The valve element 82 assumes the form of a butterfly plate in the illustrated embodiment and is thus referred to hereafter as a "butterfly plate 82." The butterfly plate 82 is mechanically linked to an EM valve actuator 84, which is further contained within the housing 76, 78. The particular manner in which the EM valve actuator 84 is mechanically linked to the butterfly plate 82 will vary among embodiments depending upon, for example, whether the EM valve actuator 84 is a linear or rotary EM actuator. In the illustrated example, the EM valve actuator 84 is a rotary actuator, which is connected to the butterfly plate 82 by a shaft 86 supported by a bearing 88 (e.g., a rolling element bearing) nested within a generally cylindrical neck region 90 of the flow body 78. Control electronics 92, such as a printed wiring board carrying one or more semiconductor die and possibly other microelectronic components, are further contained in the housing 76, 78 (specifically, within the controller sub-housing 76) and electrically coupled to the valve actuator 84. The control electronics 92 are, in turn, electrically interconnected with an electrical connector 94 projecting from the controller sub-housing 76. Bond wires 96 may be utilized to provide this electrical interconnection, as illustrated, as can various other interconnect features in further embodiments.

The electrical connector 94 can assume any form suitable for supplying power to and signal communication with the control electronics 92 contained within sub-housing 76. In the illustrated example, the electrical connector 94 assumes the form of a multi-terminal electrical connector; that is, an electrical connector including two or more electrically-conductive terminals 98 (e.g., pins, sockets, or a combination thereof), which are placed in electrical communication with corresponding terminals or contacts when the electrical connector 94 is joined to a mating electrical connector. In embodiments, the multi-terminal electrical connector 94 may include a (e.g., molded plastic) body having a socket or blind cavity 100 in which the electrically-conductive terminals 98 are recessed. An example of a corresponding electrical connector 102, which may be matingly connected to the electrical connector 94 to establish electrical communication with the control electronics 92, is shown on the right of FIG. 3. During operation, command signals are transmitted to the control electronics 92 from a suitable command source, such as engine control unit 46 shown in FIG. 1. In accordance with such commands, the control electronics 92 transmit corresponding signals to the valve actuator 84 to rotate the butterfly plate 82 into differing angular positions and thereby control exhaust flow through the flow passage 80 of flow body 78, as represented in FIG. 2 by arrow 104.

Figure 4:
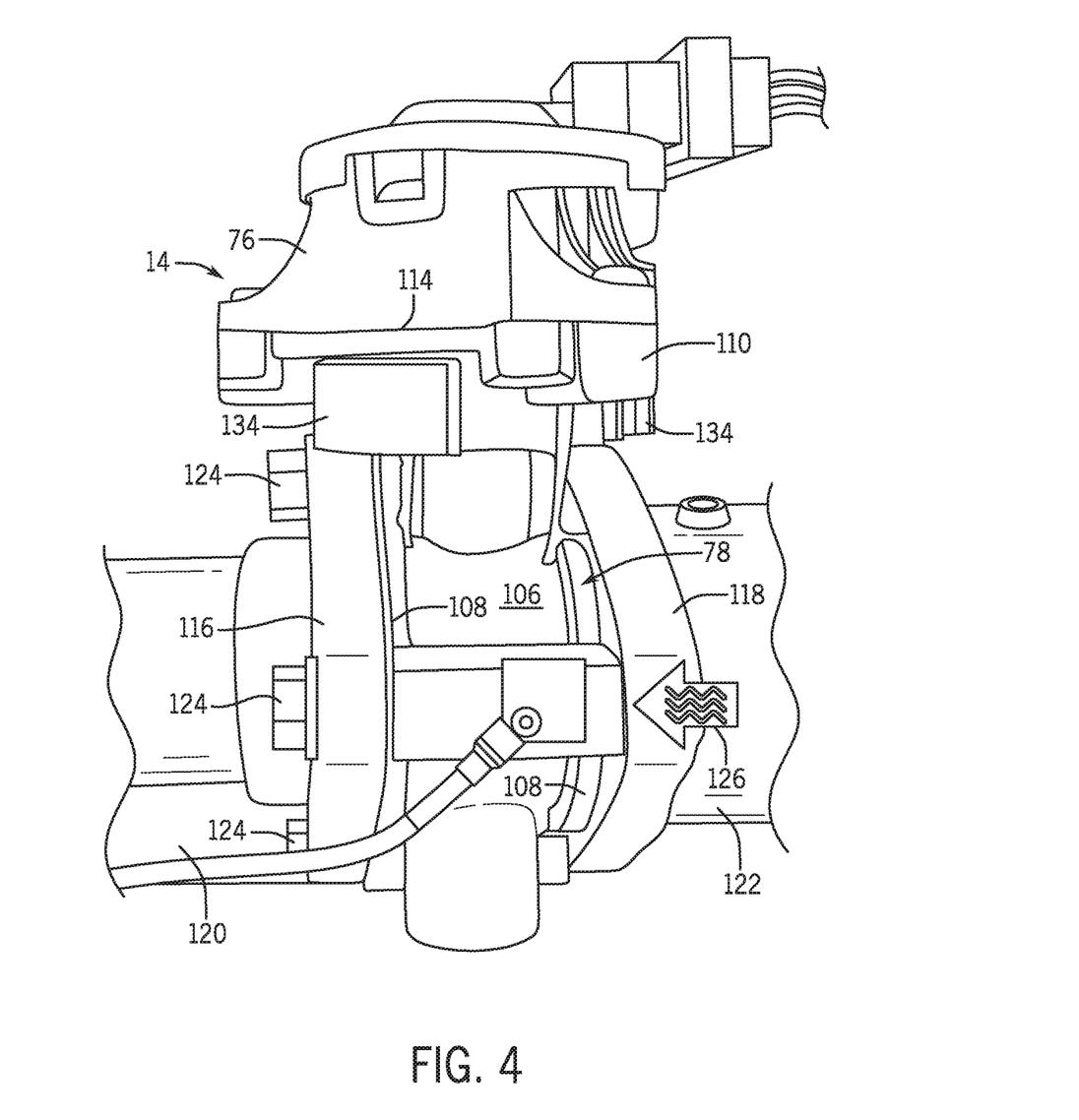
FIG. 4 is a perspective view of the EGR valve assembly shown in FIGS. 2 and 3 installed within a work vehicle engine (partially shown)

Referring now also to FIG. 4, the flow body 78 of the externally-damped EM valve assembly 14 may have various different form factors and constructions. In the illustrated embodiment, the flow body 78 includes a generally tubular main body 106 through which the flow passage 80 extends. Peripheral flanges 108 are provided around opposing ends of the main body 106 to facilitate installation of the flow body 78 and, more generally, the externally-damped EM valve assembly 14 within the work vehicle engine 10. In this regard, and as shown in FIG. 4, the peripheral flanges 108 may be attached to mating flanges 116, 118 provided around other conduits 120, 122 within the work vehicle engine 10 utilizing bolts 124 or other fasteners. Finally, the flow body 78 may further include a tower region or upper platform 110, which is joined to the main body 106 through the cylindrical neck region 90. The controller sub-housing 76 is mounted to the platform 110 of the flow body 78 utilizing, for example, fasteners 112 shown in FIG. 3. The interface along which the controller sub-housing 76 seats against or otherwise engages the platform 110 is identified by reference numeral 114 and is referred to herein as "attachment interface 114."

Vibrations generated during operation of the work vehicle engine 10 may be transmitted to the externally-damped EM valve assembly 14. Specifically, as indicated by arrow 126 appearing in FIGS. 2 and 4, vibratory input may enter the housing 76, 78 via the right side of the flow body 78, which may be positioned closest the engine core 28 in the orientation shown in FIGS. 2-4. Vibrations may also enter the flow body 78 via its left side in certain implementations; however, in at least some embodiments, the conduit 120 may be coupled to a non-illustrated bellows, which reduces disturbance forces transmitted from this direction. Regardless of the particular direction or directions in which the vibrations are introduced into the flow body 78, the vibrational (kinetic) energy may be transmitted into the flow body 78, travel along a primary vibration transmission path 128, and ultimately disturb the electronic components of the EM valve assembly 14. In this regard, and as schematically indicated in FIG. 2, the primary vibration transmission path 128 may generally extend from a first point or node 130 located at a mounting interface of the flow body 78 (here, the right flange 108) to a second point or node 132, which terminates at the multi-terminal electrical connector 94. As a result of this structural configuration, such vibrational energy tends to cumulate at the node 132 within the electrical connector 94, potentially causing small rapid movement or "jitter" in this region of the connector 94 driving fretting of the connector terminals 98 over time. Similarly, the vibrational energy may also be transmitted through the control electronics 92 and become a causal factor driving the occurrence of critical faults due to, for example, the gradual material fatigue and structural failure of the bond wires 96, solder joints, or other such interconnect features. As described throughout this document, it has been discovered that such vibrational energy tends to be particularly problematic at hastening failure modes observed at higher frequency ranges, such as frequency ranges between about 300 Hz and about 2000 Hz, in at least some instances.

To reduce the amplitude and severity of vibrations transmitted to the control electronics 92, the electrical connector 94, and/or other such electronic valve assembly components, the EM valve assembly 14 is further equipped with at least one constrained layer isolation device or damper 134 mounted to an exterior surface of the housing 76, 78. In the illustrated example, specifically, the EM valve assembly 14 includes three such constrained layer dampers 134, which are distributed around an outer circumferential or peripheral surface of the neck region 90 of the flow body 78. The constrained layer dampers 134 may each be mounted proximate or adjacent the attachment interface 114; that is, the interface along which the controller sub-housing 76 engages the platform 110 of the flow body 78. Each constrained layer damper 134 contains at least one mass element, which is mounted in suspension to an exterior surface of the flow body 78 for movement relative thereto when the mass element is (or mass elements are) excited by vibrations transmitted through the flow body 78. Such relative movement may occur predominately as reciprocating motion along an axis parallel to the centerline of the neck region 90, as indicated in FIG. 2 by arrows 136. At least one viscoelastic layer is physically constrained between the mass element (or elements) and the exterior surface of the housing 76, 78; that is, the viscoelastic layer is disposed between the mass element and the housing exterior such that movement between the mass element and the housing results in deflection or distortion of the viscoelastic layer. The viscoelastic layer or layers deflect in shear as the mass element moves (or mass elements move) relative to the housing 76, 78 to attenuate the vibrations by conversion of vibrational energy to heat within the viscoelastic material. This is further indicated in FIG. 2 by vibration path offshoot or siphon 138 stemming from the primary vibration transmission path 128, as well as by the node(s) 140 terminating in the mass element layer(s) of the damper 134.

Figure 5:
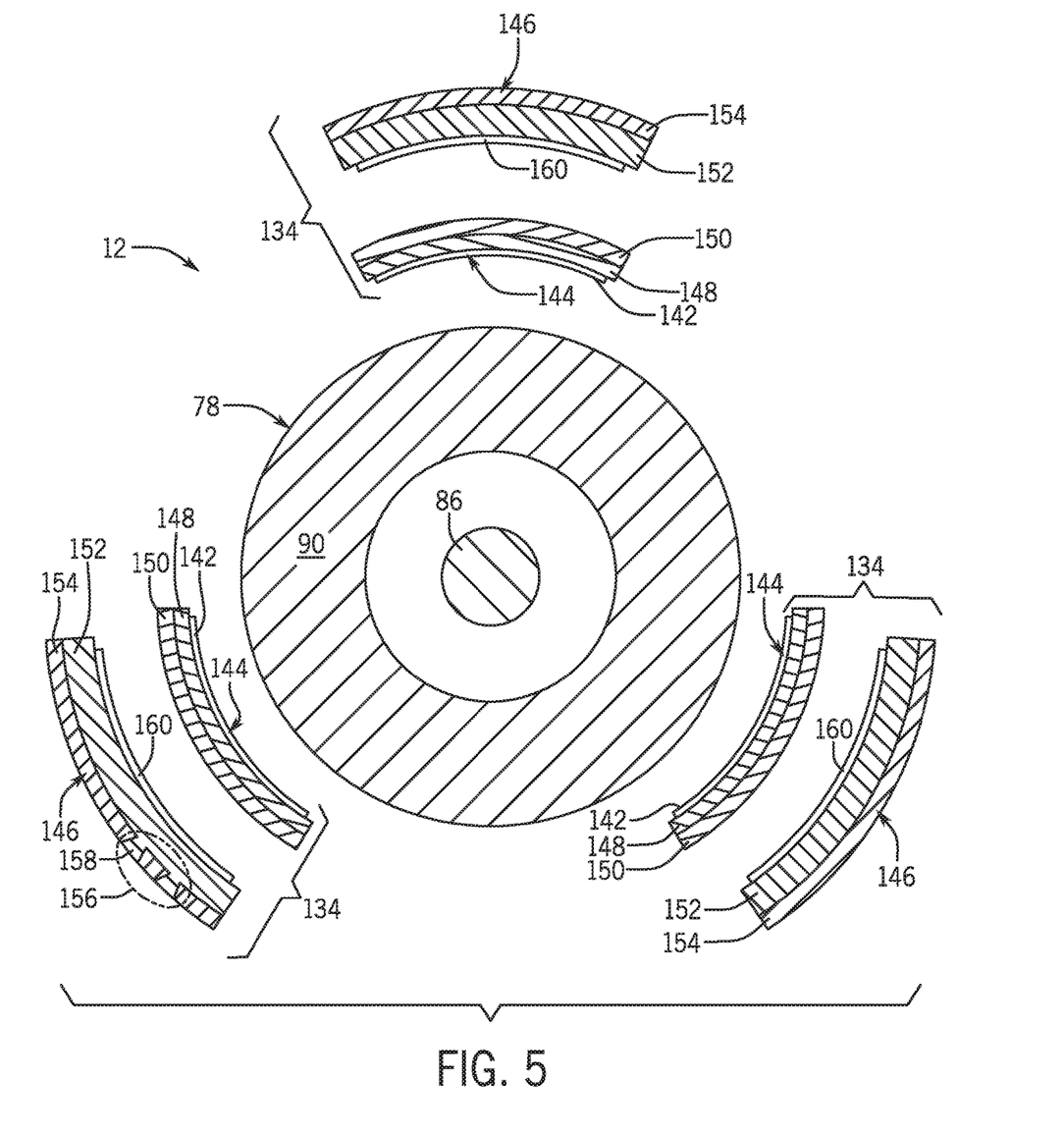
FIG. 5 is an exploded cross-sectional schematic taken through the flow body of the EM valve assembly (FIGS. 2-4) and depicting one manner in which multiple constrained layer dampers may be distributed around an outer periphery of the flow body in an annular array.

Referring now also to FIG. 5, it can be seen that the constrained layer dampers 134 are angularly spaced or distributed around an outer circumferential or peripheral surface of the neck region 90 of the flow body 78 in an annular array or grouping. The constrained layer dampers 134 may be spaced at substantially equivalent (e.g., 120 degree) intervals around the neck region 90, as depicted; however, this need not be the case in all embodiments, noting that the spacing of the constrained layer dampers 134 can be adjusted, as appropriate, to accommodate any protruding structural features or outer topography of the neck region 90. As shown exclusively in FIG. 5, an adhesive layer 142 may be utilized to bond each constrained layer damper 134 to a desired attachment point on the exterior of the flow body 78. Other attachment mechanisms are possible in further embodiments including, for example, damper attachment by way of physical retention or clamping, as discussed below in connection with FIGS. 6 and 7. Further, in alternative embodiments, a greater or lesser number of the constrained layer dampers 134 may be positioned around the neck region 90 of the flow body 78. The positioning and number of the constrained layer dampers 134 employed may vary depending upon the size of the dampers, the surface area available for damper attachment, the presence of bosses and other such structural features that may interfere with damper attachment, and other such factors.

As a point of emphasis, the externally-mounted constrained layer dampers 134 can assume various forms providing that each constrained layer damper contains at least one viscoelastic layer in vibratory communication with a suspended mass element, which can move relative to a valve assembly housing when the mass element is excited by vibrations within a particular frequency range. In certain cases, one or more of the constrained layer dampers 134 may contain multiple viscoelastic layers interspersed with multiple mass elements in, for example, an alternating relationship. The inclusion of multiple viscoelastic layers and multiple interspersed mass elements may be advantageous in that each viscoelastic layer-mass element pair can be independently imparted with a different tuning to broaden the cumulative damping capabilities of the constrained layer damper 134. Further, such viscoelastic layer-mass element pairs (more generally referred to herein as "damper portions") can be disposed in a stacked relationship and, therefore, mechanically coupled in series as taken along vibration diversion path or siphon 138 shown in FIG. 2. Additional description in this regard is provided below. Finally, while the externally-mounted constrained layer dampers 134 disposed around the neck region 90 of the flow body 78 are substantially identical (and generally uniformly tuned) in the illustrated example, further embodiments of the externally-damped EM valve assembly 14 can include multiple externally-mounted constrained layer dampers having varying constructions and tunings, as suitable to satisfy the demands of any particular application.

In the embodiment of FIGS. 2-5, and referring specifically to FIG. 5, the externally-mounted constrained layer dampers 134 each include two discretely-tuned damper portions: an inner damper portion 144 and an outer damper portion 146. As indicated by the term "inner," the inner damper portions 144 are located closer to the neck region 90 of the flow body 78 than are the outer damper portions 146. Conversely, the term "outer" denotes that the outer damper portions 146 are located further from the neck region 90 of the flow body 78, with the outer damper portions 146 mounted to the neck region 90 through the inner damper portions 144. The inner damper portions 144 each include, in turn, at least one viscoelastic layer 148 affixed to at least one mass element 150. Similarly, the outer damper portion 146 likewise includes at least one viscoelastic layer 152 affixed to at least one mass element 154. The viscoelastic layer-mass element pairs 148, 150 and 152, 154 may be affixed by bonding, whether utilizing an intervening layer of bonding material; by directly bonding the viscoelastic layers 148, 152 to the mass elements 150, 154 utilizing, for example, an over-molding process; or in some other manner. In still other embodiments, the viscoelastic layer-mass element pairs 148, 150 and 152, 154 may not be directly bonded, but rather physically retained together in some manner to allow the desired vibratory communication between these structural components; e.g., the viscoelastic layer-mass element pairs 148, 150 and 152, 154 may be pressed together utilizing a mechanical attachment approach, such as a clamp mechanism similar to that described below in connection with FIGS. 6 and 7.

The mass elements 150, 154 contained in constrained layer dampers 134 may have differing compositions, shapes, and dimensions as compared to the viscoelastic layers 148, 152. The mass elements 150, 154 will typically have a higher stiffness and a greater mass or weight than do the viscoelastic layers 148, 152. In one embodiment, the mass elements 150, 154 are metallic layers or shoes, which have arc-shaped geometries generally conformal with the curved outer geometry of the annular neck region 90 of the flow body 78. In embodiments in which the viscoelastic layers 148, 152 are over-molded onto or placed in press-fit engagement with the mass elements 150, 154, portions of the viscoelastic layers 148, 152 may extend into openings provided in the mass elements 150, 154 for enhanced adhesion and reduced likelihood of delamination. An example of this is shown in circled region 156 appearing in FIG. 5 for the outer damper portion 146 in which layer extensions 158 project from the main body of the viscoelastic layer 152 into openings provided in the mass element 154. Again, this may be accomplished by over-molding the viscoelastic layer 152 onto the mass element 154 or by separately producing the viscoelastic layer 152 to include such extensions, which are then press fit into the openings provided in the mass element 154 (possibly while further bonding the layer 152 and the element 154 utilizing a non-illustrated adhesive layer). Various other features can also be imparted to the mass elements 150, 154, as desired, such as heat dissipation fins or pin-fins projecting outwardly from the outer mass element 154 in a direction opposite the viscoelastic layer 152. Further, the viscoelastic layers 148, 152 can likewise be produced to have various different compositions and constructions, with each viscoelastic layer potentially formed from any number of sub-layers. Finally, as indicated in FIG. 5 for each constrained layer damper 134, the viscoelastic layer 152 of the outer damper portion 146 may be bonded to the mass element 150 of the inner damper portion 144 utilizing a layer of bonding material 160.

By virtue of the above-described structural arrangement, the damper portions 144, 146 are mechanically coupled in series as taken along the vibration siphon or diversion path 138. The damper portions 144, 146 are advantageously, although non-essentially imparted with disparate tunings through the selection of physical characteristics of the viscoelastic layers 148, 152 and the mass elements 150, 154, to broaden the frequency range over which the constrained layer dampers 146 provide meaningful damping upstream of the electronic components included in EM valve assembly 14. The manner in which the damper portions 144, 146 are tuned will vary among embodiments, depending upon the particular vibrational frequencies targeted for attenuation and other factors. Generally, however, the damper portions 144, 146 may be tuned to target different frequency ranges, with each frequency range extending from a minimum targeted frequency exceeding about 300 Hz to a maximum targeted frequency equal to or less than about 2000 Hz. In such instances, the damper portions 144, 146 may be tuned to target frequencies ranges that are entirely overlapping, partially overlapping, or non-overlapping.

The externally-mounted constrained layer dampers 134 are advantageously imparted with increasingly broadband damping capabilities when the damper portions 144, 146 are tuned to provide optimal damping at non-overlapping frequency ranges. As appearing herein, vibrational frequency ranges are considered "non-overlapping" when the following conditions are satisfied for a first damper portion having a first peak damping coefficient ($c_{peak\_1}$) occurring at a first frequency and a second damper portion having a second peak damping coefficient ($c_{peak\_2}$) occurring at a second frequency. As a first condition, the second damper portion provides less than 10% $c_{peak\_2}$, on average, over a first frequency range extending from a minimum targeted frequency ($f_{min\_1}$) to a maximum targeted frequency ($f_{max\_1}$), with $c_{peak\_1}$ occurring within this frequency range ($f_{min\_1}$ to $f_{max\_1}$). As a second condition, the first damper portion provides less than 10% $c_{peak\_1}$, on average, over a second frequency range extending from a minimum targeted frequency ($f_{min\_2}$) to a maximum targeted frequency ($c_{peak\_2}$), with $c_{peak\_2}$ occurring within this range ($f_{min\_2}$ to $f_{max\_2}$). As a third and final condition, $f_{max\_2}$ is at least 100 Hz greater than $f_{min\_2}$, $f_{min\_2}$ is greater than $f_{max\_1}$) and is at least 100 Hz greater than $f_{min\_1}$. In other embodiments, the damper portions 144, 146 of each of the constrained layer dampers 134 may be tuned to target frequency ranges, which overlap wholly or in part.

As just noted, the inner damper portions 144 and the outer damper portions 146 are advantageously, although non-essentially tuned to provide peak (or appreciable) damping over different targeted frequencies ranges, which may or may not be non-overlapping. This may be accomplished, at least in part, by selecting the viscoelastic layers 148, 152 to possess different thicknesses. For example, and as indicated in FIG. 5 (although the drawing figures are not drawn to scale), the outer viscoelastic layers 152 may each be imparted with a predetermined thickness greater than (e.g., at least 50% greater than) the thickness of the inner viscoelastic layers 148. Similarly, the dimensions and respective masses of the mass elements 150, 154 may be varied by design; however, this may not be necessary to achieve the desired tunings. In still other embodiments, the viscoelastic layers 148, 152 (or, perhaps, the mass elements 150, 154) may be composed of different materials (e.g., molded thermoplastics having differing elasticities) to tailor the tuning of the damper portions 144, 146 toward different targeted frequency ranges. Regardless of the particular manner or manners in which such a tuning disparity is achieved, the damper portions 144, 146 are usefully tuned to target non-overlapping (or only slight overlapping) frequencies ranges to enable the externally-mounted constrained layer dampers 134 provide vibration attenuation or dissipation over a greater cumulative frequency range. This notwithstanding, the externally-mounted constrained layer dampers 134 may not contain multiple independent-tuned damper portions in further embodiments; or, instead, may include three or more damper portions (viscoelastic layer-mass element pairs), any combination of which may have disparate tunings.

Through the provision of the constrained layer dampers 134, the magnitude of vibrations transmitted to the electronic components (e.g., the control electronics 92 and the electrical connector 94) during operation of the work vehicle engine 10 (FIG. 1) is favorably reduced. Such vibration attenuation is accomplished by diverting a fraction of the vibrational energy imparted to flow body 78 into the constrained layer dampers 134 prior to delivery of the vibrational energy into the control electronics 92 and the electrical connector 94. When this vibrational energy is sufficient to excite (that is, induce appreciable relative movement of) the mass elements 150 and/or the mass elements 154, shearing or other movement within the viscoelastic layers 148, 152 induced by movement of the mass elements 150, 154 converts vibrational energy to heat within the viscoelastic layers 148, 152. The amplitude of vibrations reaching the electronic components within the externally-damped EM valve assembly 14 is consequently reduced over the frequency range or ranges at which constrained layer dampers 134 are responsive or active. The overall reliability of the externally-damped EM valve assembly 14 in providing prolonged, failure-free within a high vibratory environment may be improved as a result, with the incorporation of the constrained layer dampers 134 further adds modest cost to EM valve assembly 14 and requiring relatively little, if any modification to the other components of EM valve assembly 14. In at least some instances, the constrained layer dampers 134 may be bonded or otherwise affixed around the neck region 90 of flow body 78 after original manufacture (e.g., as a retrofit attachment) to transform a non-damped EM valve assembly into the externally-damped EM valve assembly 14.

A first example of an externally-damped EM valve assembly in the form of EM valve assembly 14 has thus been provided. In the above-described example of the externally-damped EM valve assembly 14, multiple constrained layer dampers 134 are distributed around an outer periphery of the neck region 90 of the flow body 78 in an annular array or grouping. In further embodiments of the externally-damped EM valve assembly, a different number of constrained layer dampers may be incorporated into the EM valve assembly and mounted to an exterior surface of the EM valve assembly housing at alternative locations. Additionally, the manner in which the externally-mounted constrained layer dampers are mounted to the housing can vary amongst embodiments, with the above-described bonding interface providing but one suitable example. To help emphasize these points, further description will now be provided of a second example embodiment of an externally-damped EM valve assembly in the form of FMU-equipped EM valve assembly 12, which is schematically shown in FIG. 1 and further discussed below in connection with FIGS. 6 and 7.

Figure 6:
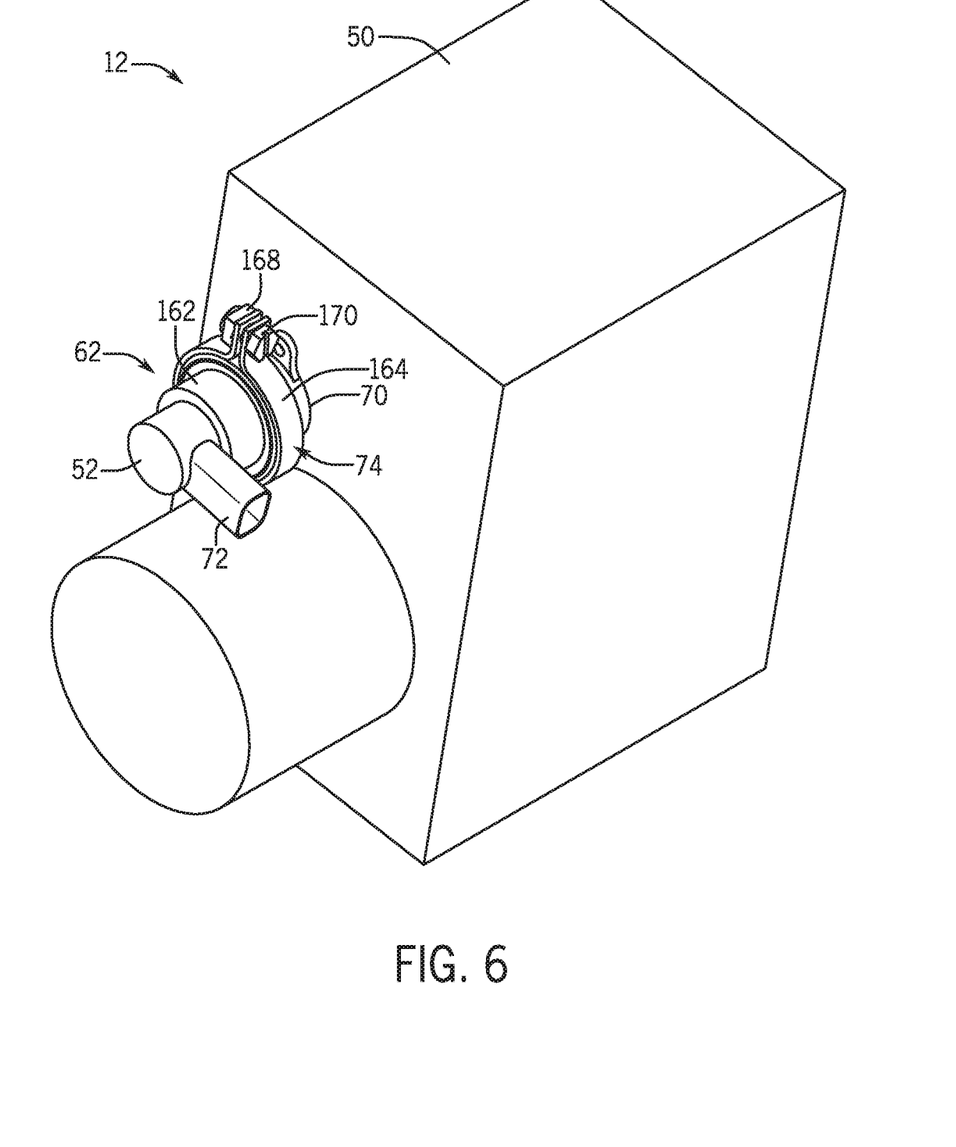
FIG. 6 is a simplified isometric view of a second example externally-damped EM valve assembly, here a metered fuel pump assembly including an FMU and clamp-style constrained layer damper, well-suited for deployment in the work vehicle engine shown in FIG. 1.
Figure 7:
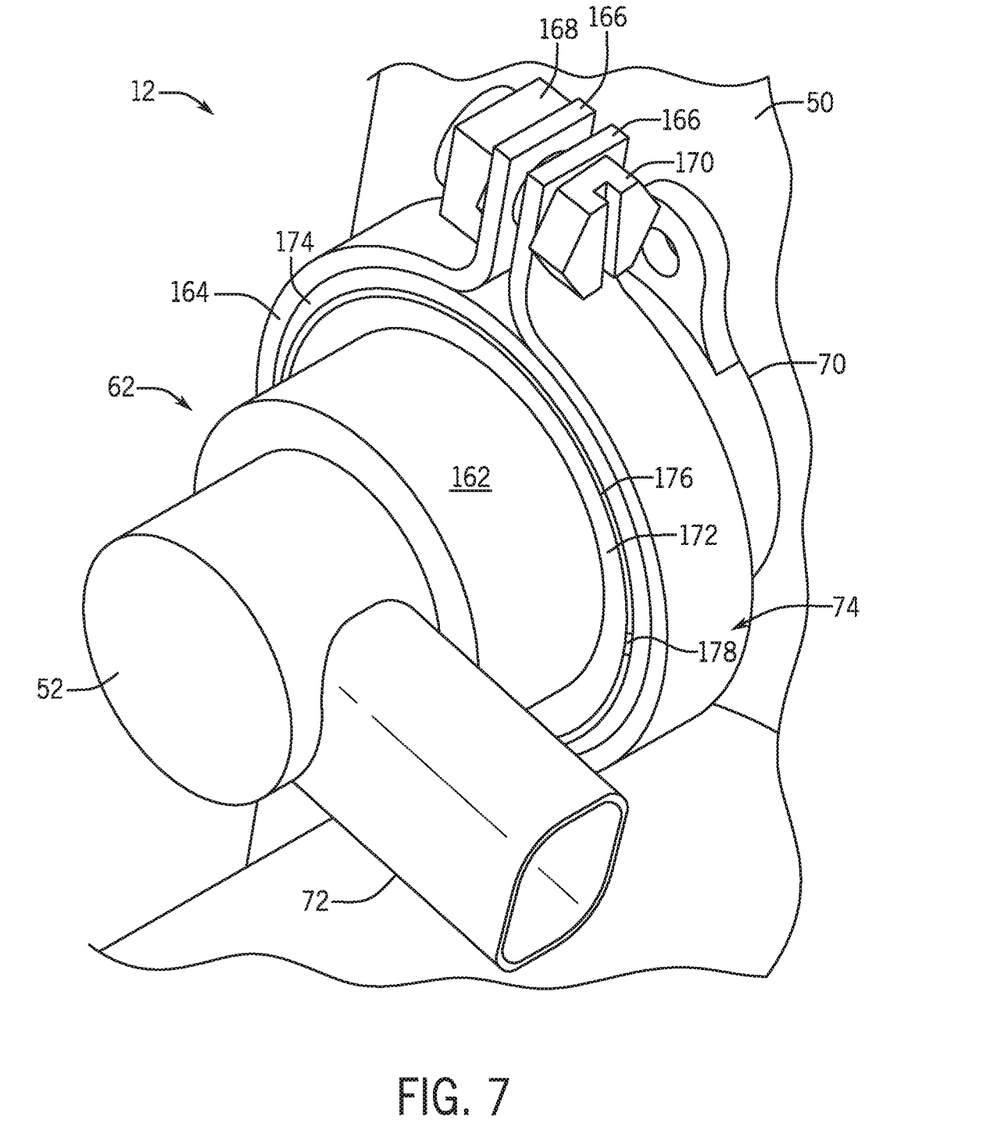
FIG. 7 is a detailed isometric view of the FMU and the constrained layer damper shown in FIG. 6.

Referring now to FIGS. 6 and 7, the externally-damped EM valve assembly 12 is shown in greater detail, with reference numerals continued from FIG. 1 where appropriate. Here, it can be seen that the flow body 50 of the externally-damped EM valve assembly 12 may assume the form of a relatively large metallic body to which the controller sub-housing 52 (e.g., a smaller molded plastic housing) is mounted. The controller sub-housing 52 includes an annular or cylindrical section 162 around which the constrained layer damper 74 is disposed. In a manner similar to that described above, the constrained layer damper 74 is disposed proximate or adjacent the attachment interface 70 formed between the flow body 50 and the controller sub-housing 52. In this particular example, only a single constrained layer damper 74 is present and assumes the form of a clamp-style device, including an outer annular clamp ring 164 terminating in two outwardly-bent flanges 166. Fastener hardware, here a nut 168 and bolt 170, is disposed through aligning openings provided in the outwardly-bent flanges 166 and tightened to exert a circumferentially clamping force around the outer peripheral surface of the controller sub-housing 52 and thereby retain the constrained layer damper 74 in its desired position. In further embodiments, a different clamping mechanical can be utilized to attach clamp-style constrained layer damper 74, such as worm or segmented band clamp attachment.

The externally-mounted constrained layer damper 74 includes one or more viscoelastic layers placed in vibratory communication with one or more mass elements. For example, and as shown in FIG. 7, the constrained layer damper 74 may include two viscoelastic layers 172, 174 separated by a generally tubular intervening mass layer 176, such as a C-shaped metal ring. The tubular intervening mass layer 176 forms an incomplete ring, with the terminal ends of the mass layer 176 separated by a gap 178. The gap 178 permits constriction of the tubular intervening mass layer 176 about the inner viscoelastic layer 172 when the outer annular clamp ring 164 is tightened around the outer annular surface 162 of the controller sub-housing 52. Further, in the illustrated example, the tubular intervening mass layer 176 serves as a first mass element, which cooperates to a first or inner damper portion with the inner viscoelastic layer 172. Similarly, the outer annular clamp ring 164 serves as a second mass element, which forms a second or outer damper portion in combination with the outer viscoelastic layer 174. Thus, once again, a constrained layer damper 74 is provided having two series-coupled damper portions 172, 176 and 174, 164, which can be imparted with disparate tunings via selection of material layer thicknesses, densities, elasticities, and the like broaden the damping capabilities of the externally-mounted constrained layer damper 74. The tunings of the damper portions 172, 176 and 174, 164 may be wholly overlapping, partially overlapping, or non-overlapping, as previously described. In embodiments, the constrained layer damper 74 may be tuned to provide damping of vibrations within a targeted frequency range extending from a minimum targeted frequency greater than 300 Hz to a maximum targeted frequency equal to or less than 2000 Hz. In other embodiments, the constrained layer damper 74 may be tuned to damping vibrations in a targeted range greater than or less than the aforementioned range.

Beneficially, the externally-mounted, clamp-style constrained layer damper 74 shown in FIGS. 1, 6, and 7 can be affixed around the annular section 162 of the controller sub-housing 52 in a highly secure manner and with little, if any likelihood of detachment over time. Should any loosening of the constrained layer damper 74 occur overtime, such loosening can easily be corrected through periodic maintenance and tightening of the fastening hardware 168, 170. Further, if desired, an annular groove or channel can be provided around an outer circumference of the controller sub-housing 52 (e.g., as a molded feature) to matingly receive an inner peripheral portion of the constrained layer damper 74 in embodiments; however, this is not required. Finally, in other embodiments, clamp-style constrained layer damper 74 can be replaced by multiple constrained layer dampers positioned around an outer periphery of the controller sub-housing 52 in a manner similar to that described above in connection with constrained layer dampers 134 of EGR valve assembly 12 (FIGS. 1-5). Similarly, the constrained layer dampers 134 of EGR valve assembly 12 can be replaced by a single, clamp-style constrained layer damper device similar to the constrained layer damper 74 shown in FIGS. 1, 6, and 7 in further embodiments, with cutouts or notches provided where needed to accommodate the passage of bosses or other features projecting from the annular neck region 90 of the flow body 78. Generally, then, it should be understood that the various embodiments described herein can be combined and modified in numerous different respects (and similar constrained layer dampers applied to other EM valve assemblies included in the work vehicle engine 10) to yield still further embodiments of the present disclosure.

Due to the provision of the externally-mounted constrained layer damper 74, vibrations originally from a disturbance source (e.g., the HP pump 56 contained in the flow body, the transmitted from the flow body 50, through the attachment interface 70, and to the controller sub-housing 52 may be damped prior to reaching the control electronics 68 (which may be housed in an outermost portion of sub-housing 52 furthest interface 70) and/or the multi-terminal electrical connector 72. The constrained layer damper 74 thus provides a convenient, relatively low cost mechanism by which damping can be introduced into the externally-damped EM valve assembly 12 and, more specifically, into the FMU 62 to reduce the exposure of electronic components of the FMU 62 (e.g., the control electronics 68, the multi-terminal electrical connector 72, and any associated electrical interconnections) during operation of the EM valve assembly 12. The EM valve assembly 12 can thus be equipped with the externally-mounted constrained layer damper 74 with little additional cost and relatively minor modifications, if any modifications are necessary, to enhance the overall reliability of the pump assembly 12 by reducing the likelihood of vibration-induced failure modes within the FMU electronics. This is highly desirable and represents a beneficial technical solution to a technical problem, which has ostensibly not been recognized or addressed in a comparable manner by conventional approaches to date.

The following examples pf externally-damped EM valve assemblies are provided, which are numbered for ease of reference.

An externally-damped EM valve assembly, including: a housing through which a flow passage extends; a valve element contained in the housing and positioned in the flow passage; a valve actuator mechanically linked to the valve element; control electronics electrically coupled to the valve actuator; and a first constrained layer isolation device or damper. The first constrained layer damper includes, in turn: (i) a first mass element mounted in suspension to an exterior surface of the housing for movement relative thereto when the first mass element is excited by vibrations transmitted through the housing; and (ii) a first viscoelastic layer constrained between the first mass element and the exterior surface of the housing. The first viscoelastic layer deflects in shear as the first mass element moves relative to the housing to attenuate the vibrations transmitted through the housing by conversion of vibrational energy to heat.

2. The externally-damped EM valve assembly of example 1, wherein the constrained layer damper is disposed about an outer periphery of the housing.

3. The externally-damped EM valve assembly of example 1, wherein the first constrained layer damper is tuned to dampen vibrations over a predetermined frequency range extending from a minimum targeted frequency to a maximum targeted frequency. The minimum targeted frequency is greater than 300 Hz, while the maximum targeted frequency is greater than the minimum targeted frequency and less than 2000 Hz.

4. The externally-damped EM valve assembly of example 1, wherein the housing includes: (i) a flow body through which the flow passage extends; and (ii) a controller sub-housing containing the control electronics and mounted to the flow body at an attachment interface. The first constrained layer damper is affixed or mounted to the housing at a location adjacent the attachment interface.

5. The externally-damped EM valve assembly of example 1, wherein the housing includes: (i) a flow body through which the flow passage extends; (ii) a controller sub-housing mounted to the flow body and containing the control electronics; and (iii) an electrical connector projecting from the controller sub-housing and electrically coupled to the control electronics. The first constrained layer damper is tuned and positioned to attenuate vibrations transmitted through the flow body prior to reaching the electrical connector.

6. The externally-damped EM valve assembly of example 5, further including a primary vibration transmission path extending through the flow body, through the controller sub-housing, and to the electrical connector; wherein the constrained layer damper circumscribes a segment of the primary vibration transmission extending through at least one of the flow body and the controller sub-housing.

7. The externally-damped EM valve assembly of example 1, wherein the first mass element includes a metallic body engaging the first viscoelastic layer opposite the exterior surface of the housing.

8. The externally-damped EM valve assembly of example 1, wherein the first constrained layer damper further contains: (i) a first damper portion in which the first mass element and the first viscoelastic layer are included; and (ii) a second damper portion mounted in suspension to the first damper portion opposite the exterior surface of the housing.

9. The externally-damped EM valve assembly of example 8, wherein second damper portion includes: (i) a second mass element coupled to the first viscoelastic layer through the first mass element; and (ii) a second viscoelastic layer constrained between the second mass element and the first mass element, the second viscoelastic layer having a predetermined thickness different than a predetermined thickness of the first viscoelastic layer.

10. The externally-damped EM valve assembly of example 8, wherein the first damper portion is tuned to dampen vibrations over a first frequency range; and wherein the second damper portion is tuned to dampen vibrations over a second frequency range different than the first frequency range.

11. The externally-damped EM valve assembly of example 10, wherein the first frequency range and the second frequency range are non-overlapping.

12. The externally-damped EM valve assembly of example 1, wherein the first mass element includes an annular clamp member, which is tightened around an annular section of the housing to compress the first viscoelastic layer against the exterior surface.

13. The externally-damped EM valve assembly of example 1, further including a plurality of constrained layer dampers in which the first constrained layer damper is included, the plurality of constrained layer dampers is spaced about an outer periphery of the housing in an annular array.

14. The externally-damped EM valve assembly of example 1, wherein, during operation of the externally-damped EM valve assembly, the control electronics selectively command the valve actuator to move the valve element to regulate the flow of exhaust generated by an engine. Further, the first constrained layer damper is tuned and positioned to attenuate vibrations transmitted to the housing from the engine.

15. The externally-damped EM valve assembly of example 1, wherein the externally-damped EM valve assembly is utilized in conjunction with a translating piston fuel pump. During operation of the externally-damped EM valve assembly, the control electronics selectively commands the valve actuator to move the valve element and meter fuel conducted through the flow passage under influence of the fuel pump. Additionally, the first constrained layer damper is tuned and positioned to attenuate vibrations transmitted to the housing from the translating piston fuel pump.

There has thus been provided EM valve assemblies better capable of tolerating high frequency vibrations and other harsh operating conditions to reduce the likelihood of electronic failure modes. The above-described externally-damped EM valve assemblies feature externally-mounted constrained layer dampers, which are positioned and tuned to attenuate vibrations prior to transmission to vibration-sensitive electronic components included in the valve assemblies, such as controller electronics, multi-pin terminates prone to fretting, and wire bonds or other interconnect features. Embodiments of the constrained layer damper can be mounted to the exterior housing of an EM valve assembly in a secure manner and, perhaps, as a retrofit requiring little, if any modification to the underlying valve assembly. The externally-mounted dampers described herein are consequently amenable to integration into existing EM valve assemblies with minimal cost, while reducing the likelihood of failure modes within the valve assembly electronics to enhance the overall reliability and operational longevity of the EM valve assemblies within high vibratory operational environments.

As used herein, the singular forms "a", "an" and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An externally-damped electromechanical (EM) valve assembly, comprising:
   a housing through which a flow passage extends;
   a valve element contained in the housing and positioned in the flow passage;
   a valve actuator mechanically linked to the valve element;
   control electronics electrically coupled to the valve actuator; and
   a first constrained layer damper, comprising:
      a first mass element mounted in suspension to an exterior surface of the housing for movement relative thereto when the first mass element is excited by vibrations transmitted through the housing; and
      a first viscoelastic layer constrained between the first mass element and the exterior surface of the housing, the first viscoelastic layer deflecting in shear as the first mass element moves relative to the housing to attenuate the vibrations transmitted through the housing by conversion of vibrational energy to heat;
   wherein the housing comprises:
      a flow body through which the flow passage extends;
      a controller sub-housing mounted to the flow body and containing the control electronics; and
      an electrical connector projecting from the controller sub-housing and electrically coupled to the control electronics, the first constrained layer damper tuned and positioned to attenuate vibrations transmitted through the flow body prior to reaching the electrical connector;
   wherein a primary vibration transmission path extends through the flow body, through the controller sub-housing, and to the electrical connector; and
   wherein the first constrained layer damper circumscribes a segment of the primary vibration transmission path extending through the flow body and the controller sub-housing.

2. The externally-damped EM valve assembly of claim 1, wherein the first constrained layer damper is tuned to dampen vibrations over a predetermined frequency range extending from a minimum targeted frequency to a maximum targeted frequency;
   wherein the minimum targeted frequency is greater than three hundred hertz; and
   wherein the maximum targeted frequency is greater than the minimum targeted frequency and less than two thousand hertz.

3. The externally-damped EM valve assembly of claim 1, wherein the first mass element comprises a metallic body engaging the first viscoelastic layer opposite the exterior surface of the housing.

4. The externally-damped EM valve assembly of claim 1, wherein the first constrained layer damper further comprises:
   a first damper portion in which the first mass element and the first viscoelastic layer are included; and
   a second damper portion mounted in suspension to the first damper portion opposite the exterior surface of the housing.

5. The externally-damped EM valve assembly of claim 4, wherein second damper portion comprises:

a second mass element coupled to the first viscoelastic layer through the first mass element; and a second viscoelastic layer constrained between the second mass element and the first mass element, the second viscoelastic layer having a predetermined thickness different than a predetermined thickness of the first viscoelastic layer.

6. The externally-damped EM valve assembly of claim 4, wherein the first damper portion is tuned to dampen vibrations over a first frequency range; and wherein the second damper portion is tuned to dampen vibrations over a second frequency range different than the first frequency range.

7. The externally-damped EM valve assembly of claim 6, wherein the first frequency range and the second frequency range are non-overlapping.

8. The externally-damped EM valve assembly of claim 1, wherein the first mass element comprises an annular clamp member, which is tightened to compress the first viscoelastic layer against the exterior surface.

9. The externally-damped EM valve assembly of claim 1, further comprising a plurality of constrained layer dampers in which the first constrained layer damper is included, the plurality of constrained layer dampers spaced about an outer periphery of the housing in an annular array.

10. The externally-damped EM valve assembly of claim 1, wherein, during operation of the externally-damped EM valve assembly, the control electronics selectively command the valve actuator to move the valve element to regulate the flow of exhaust generated by an engine; and wherein the first constrained layer damper is tuned and positioned to attenuate vibrations transmitted to the housing from the engine.

11. The externally-damped EM valve assembly of claim 1, wherein the externally-damped EM valve assembly is utilized in conjunction with a translating piston fuel pump;

wherein, during operation of the externally-damped EM valve assembly, the control electronics selectively command the valve actuator to move the valve element and meter fuel conducted through the flow passage under influence of the fuel pump; and wherein the first constrained layer damper is tuned and positioned to attenuate vibrations transmitted to the housing from the translating piston fuel pump.

12. An externally-damped electromechanical (EM) valve assembly, comprising:

a housing, comprising:

a flow body through which a flow passage extends;

a controller sub-housing mounted to the flow body at an attachment interface;

a valve element positioned in the flow passage;

a valve actuator mechanically linked to the valve element;

control electronics contained in the controller sub-housing and electrically coupled to the valve actuator; and a first constrained layer damper affixed to an exterior of the housing at a location adjacent the attachment interface, the first constrained layer damper comprising:

at least one mass element; and at least one viscoelastic layer in vibratory communication with the at least one mass element;

wherein the at least one mass element is mounted in suspension to the housing through the at least one viscoelastic layer such that the at least one mass element reciprocates relative to the housing, when excited by vibrations transmitted therethrough, to dissipate the vibrations by conversion to heat within the at least one viscoelastic layer; and an electrical connector projecting from the controller sub-housing and electrically coupled to the control electronics, the first constrained layer damper tuned and positioned to attenuate vibrations transmitted through the flow body prior to reaching the electrical connector;

wherein a primary vibration transmission path extends through the flow body, through the controller sub-housing, and to the electrical connector; and wherein the first constrained layer damper circumscribes a segment of the primary vibration transmission path extending path through the flow body and the controller sub-housing.

13. The externally-damped EM valve assembly of claim 12, wherein the at least one mass element comprises a plurality of mass elements; and wherein the at least one viscoelastic layer comprises a plurality of viscoelastic layer interspersed with the plurality of mass elements in a stacked relationship.

14. The externally-damped EM valve assembly of claim 12, further comprising a plurality of constrained layer dampers in which the first constrained layer damper is included, the plurality of constrained layer dampers spaced about an outer periphery of the housing in an annular array.

15. The externally-damped EM valve assembly of claim 12, wherein the constrained layer damper comprises an annular clamp device.

16. An externally-damped electromechanical (EM) valve assembly, comprising:

a housing through which a flow passage extends;

a valve element positioned in the flow passage;

a valve actuator supported by the housing and mechanically linked to the valve element;

control electronics contained in the housing and electrically coupled to the valve actuator;

an electrical connector projecting from the housing and electrically coupled to the control electronics; and a constrained layer damper mounted in suspension to an exterior surface of the housing, the constrained layer damper comprising:

a first damper portion tuned to dampen vibrations transmitted through the housing and to the electrical connector within a first predetermined frequency range; and a second damper portion tuned to dampen vibrations transmitted through the housing and to the electrical connector within a second predetermined frequency range different than the first predetermined frequency range;

wherein the housing comprises:

a flow body through which the flow passage extends;

a controller sub-housing mounted to the flow body and containing the control electronics; and the electrical connector projecting from the controller sub-housing and electrically coupled to the control electronics, the first constrained layer damper tuned and positioned to attenuate vibrations transmitted through the flow body prior to reaching the electrical connector;

wherein a primary vibration transmission path extends through the flow body, through the controller sub-housing, and to the electrical connector; and wherein the constrained layer damper circumscribes a segment of the primary vibration transmission path extending path through the flow body and the controller sub-housing.

* * * * *